US006370482B1

(12) United States Patent
Wirth

(10) Patent No.: US 6,370,482 B1
(45) Date of Patent: Apr. 9, 2002

(54) METHOD FOR AUTOMATED DIAGNOSIS OF DIAGNOSTIC OBJECTS

(75) Inventor: Rainer Wirth, Berlin (DE)

(73) Assignee: Flender Engineering & Service Antriebstechnik GmbH, Herne (DE)

(*) Notice: Subject to any disclaimer, the term of this patent is extended or adjusted under 35 U.S.C. 154(b) by 0 days.

(21) Appl. No.: 09/380,772
(22) PCT Filed: Jan. 5, 1999
(86) PCT No.: PCT/EP99/00007
 § 371 Date: Sep. 23, 1999
 § 102(e) Date: Sep. 23, 1999
(87) PCT Pub. No.: WO99/35479
 PCT Pub. Date: Jul. 15, 1999

(30) Foreign Application Priority Data

Jan. 6, 1998 (DE) .......................... 198 00 217

(51) Int. Cl.$^7$ ............................................. G01F 17/00
(52) U.S. Cl. .................... 702/56; 340/539; 340/682; 340/683; 702/33; 702/54; 702/73
(58) Field of Search ............................ 702/33, 54, 56, 702/73, 539; 340/682, 683

(56) References Cited

U.S. PATENT DOCUMENTS

| 3,526,873 A | * | 9/1970 | Burt ............................ 340/683 |
| 3,786,413 A | * | 1/1974 | Ross et al. .................... 340/58 |
| 3,798,626 A | * | 3/1974 | Weichbrot et al. ........... 340/669 |
| 5,684,718 A | * | 11/1997 | Jenkins et al. ............... 364/551 |

* cited by examiner

Primary Examiner—Arthur T. Grimley
Assistant Examiner—John Le
(74) Attorney, Agent, or Firm—Max Fogiel

(57) ABSTRACT

A process is disclosed for the automated diagnosis of monitored objects, especially of drive strings, with a stationary, fully automatically operating data collecting unit positioned on the monitored object and a monitoring terminal spatially separated therefrom, whereby the quantitative description of the damage condition and therefore the activation of data transfer and subsequent reporting of diagnosis statements at the monitoring terminal is triggered by the significance of a damage property correspondingly weighted by the damage type, or a combination of different damage properties, which are specified by the amplitude of the physical variable corresponding to the kinetic occurrences which are formed for the harmonic excitation within the spectrum of the wide band signal detected by way of sensors at the machine surface, or for the impact impulse type excitation of the high pass filtered envelope curve spectrum of the same signal, or for the discontinuously appearing determinant impulse excitation from the maximum value envelope spectrum of the same signal. The significance describes thereby the ratio of the amplitude of the damage property to the significance threshold of the damage property, whereby a variable significance threshold is used which only describes the error probability of the damage property on the basis of the amplitudes of the spectral lines surrounding the damage property.

3 Claims, 3 Drawing Sheets

METHOD FOR AUTOMATED DIAGNOSIS OF DIAGNOSTIC OBJECTS

BACKGROUND OF THE INVENTION

The invention relates to a process for the automated diagnosis of monitored objects, especially of drive strings.

Kinetic effects on drive strings lead to force effects which are transmitted as waves within the machine structure and are detectable as vibrations on the surface of the machine. The detection is thereby carried out by conversion of the mechanical into an electrical signal for example, by way of acceleration sensors and transmission and possibly analogue processing of the analog electrical signal, anti-aliasing-filtering digitalization and digital intermediate storage. The time signal which is present in digital format can again be processed, for example, by frequency band filtering, envelope curve formation or data reduction. By way of a Fourier, in general, a Fast Fourier Transform, one obtains a spectrum, the envelope curve spectrum and the maximum value envelope curve spectrum of the signal. The special lines of the frequencies associated with the kinetic effects embody thereby kinetic effects of the monitored object as well as interference signal portions.

If a spectral line or a combination of spectral lines can then by way of its frequency be definitely associated with a kinetic effect and if one can assume that the amplitude of the spectral line, weighted for the damage type, is not only a component of a wide band simulation but is significant, then the corresponding kinetic effect is present with high probability.

The described method is disclosed, for example, in "Einflüsse auf die Zuverlässigkeit von Schwingungsdiagnoseverfahren an Wälzlagern" of Rainer Wirth, Dissertation TH Zittau, 1994, and is already used for off-line processes.

The significance analysis stems from the mathematical statistic and is described, for example, in "Wahrscheinlichkeitsrechnung und mathematische Stastik", MINÖL Volume 17, B. G. Teubner Verlagsgesellschaft Leipzig, 1988, of Bayer, O.; Hackel, H.: Pieper, V.: Tiedke, J.

On the other hand, there are on-line processes which realize the surveillance of spectra and envelope curve spectra as mentioned, for example, in "Zustandsüberwachung mit InterMAC in Kraftwerks-, Bergwerks- und Prozeβanlagen" of Schuehle, R., Becker, E., published in Seeliger, A.: "AKIDA-Aachener Kolloquium für Instandhaltung, Diagnose und Anlagenüberwachung"—conference volume of the Kolloquium of May 30 to 31, 1996 in Aachen. Furthermore, the on-line process is realized by way of the amplitude surveillance for individual parameters and also described in the above-mentioned publication.

The surveillance of spectra by way of such on-line processes requires a regular data transfer as well as a regular analysis by the expert. The automated amplitude surveillance of individual parameters is only suited for continuous processes. However, as soon as changes result because of load or environmental effects, the already used processes fail.

SUMMARY OF THE INVENTION

It is an object of the invention to provide a process which, by way of the on-line data recording delivers reliable and definitely characterizing features for the remote diagnosis of condition parameters even under load changes and environmental influences and which improves the reliability of the diagnosis and operates cost effectively.

It has thereby been found especially advantageous that a stationary automatically operating data collecting unit on the monitored object monitors the significance of the desired property parameters, whereby the error probability for each damage type is predetermined. If the significance exceeds a selected predetermined value, which means the amplitude of the vibration components associated with the kinetic events exceeds the significance threshold property parameter, the significance controlled data transfer to the monitoring terminal occurs, where the transmitted data are stored and in parallel a report or alarm is initiated.

Instead of the vibration acceleration, the vibration speed or the vibration amplitude can also be monitored as physical property parameter. Apart from the housing vibration, the shaft vibration, the rotation uniformity or the torsion vibration and any other condition parameters can be measured.

Figure 1:
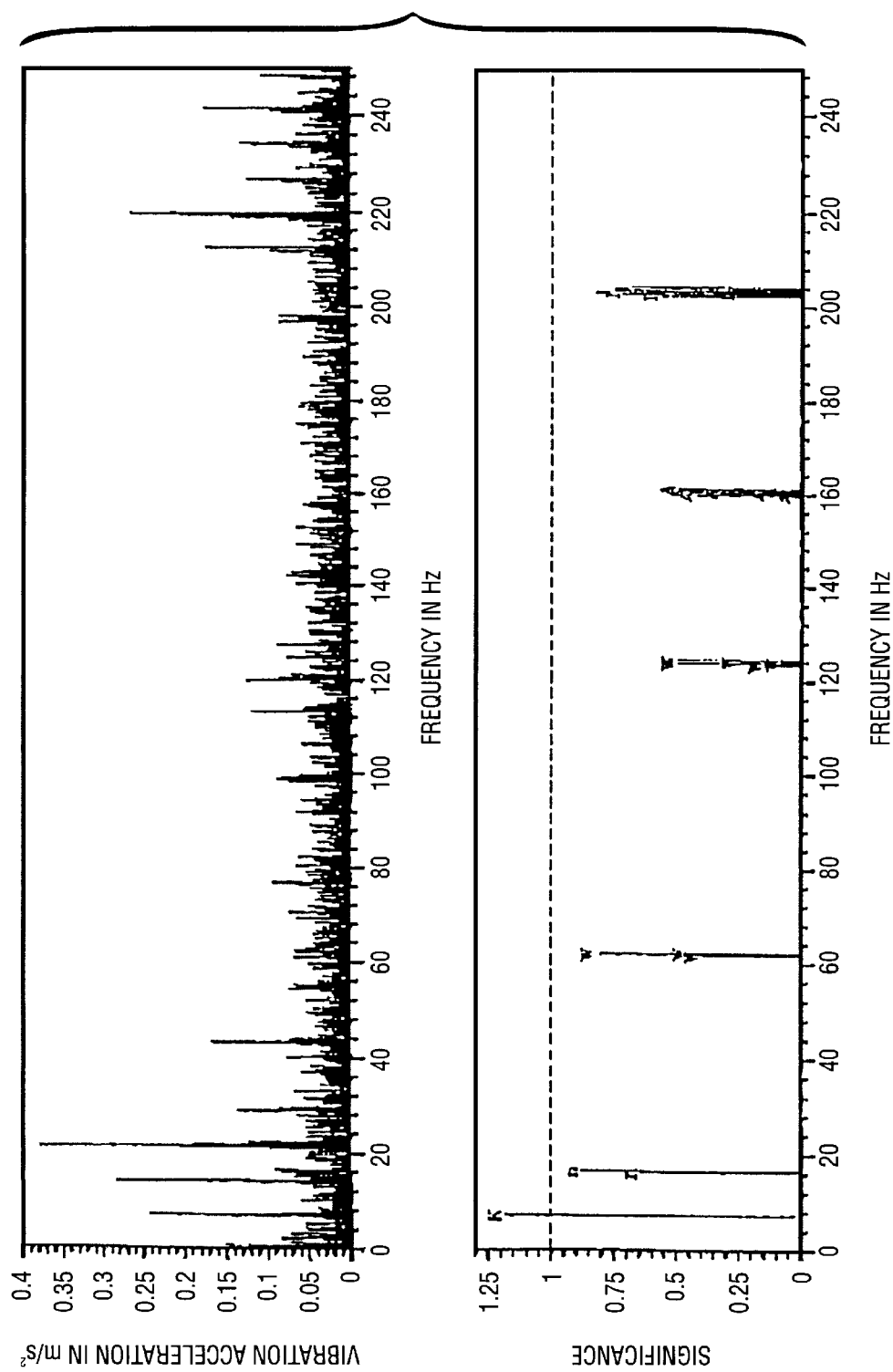
FIG. 1 is a graphical diagram showing the envelope curves and significance spectrum of the Measurement of Oct. 2, 1996.
Figure 2:
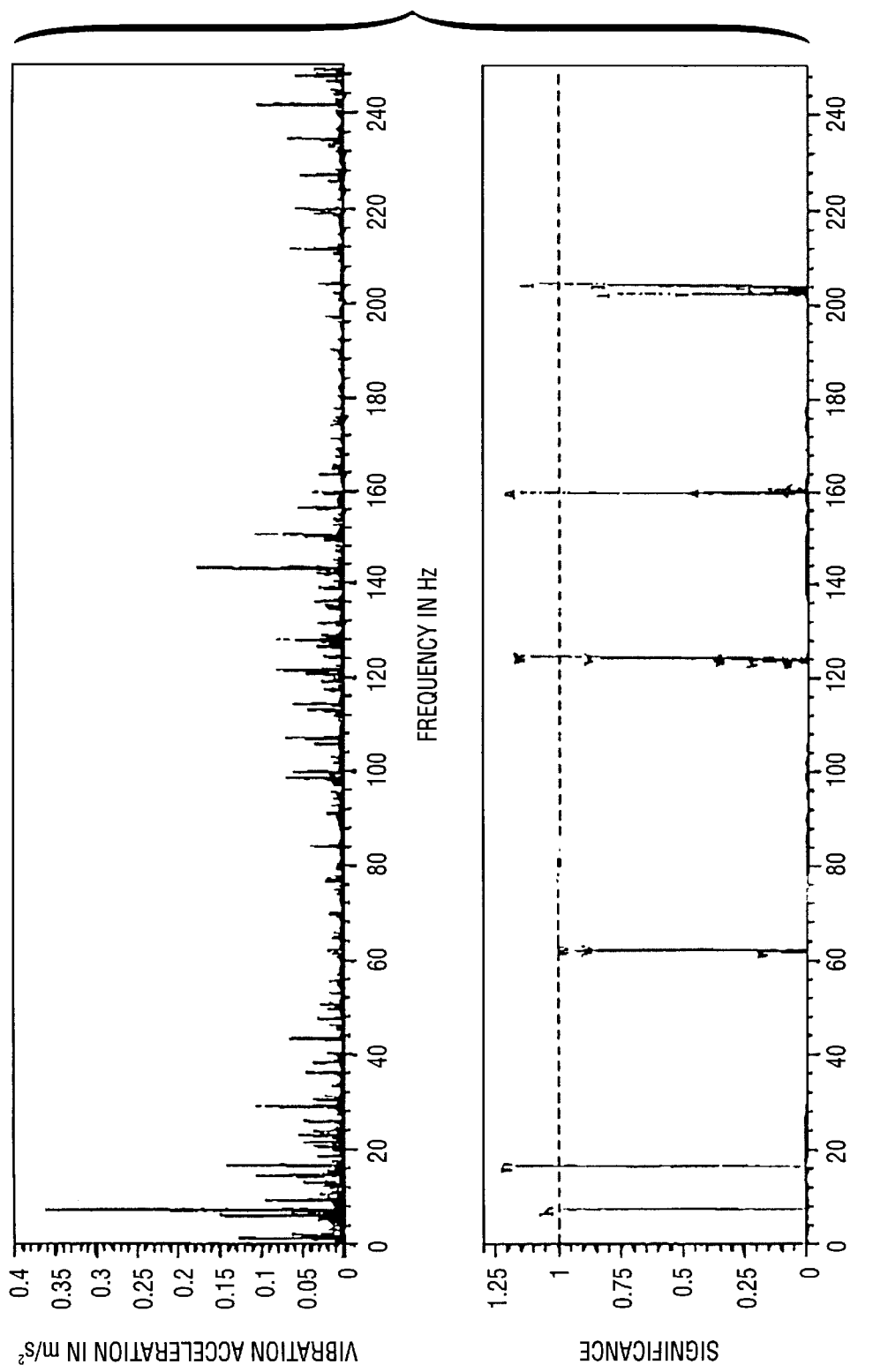
FIG. 2 is a graphical diagram showing the envelope curves and significance spectrum of the measurement of Aug. 1, 1997.
Figure 3:
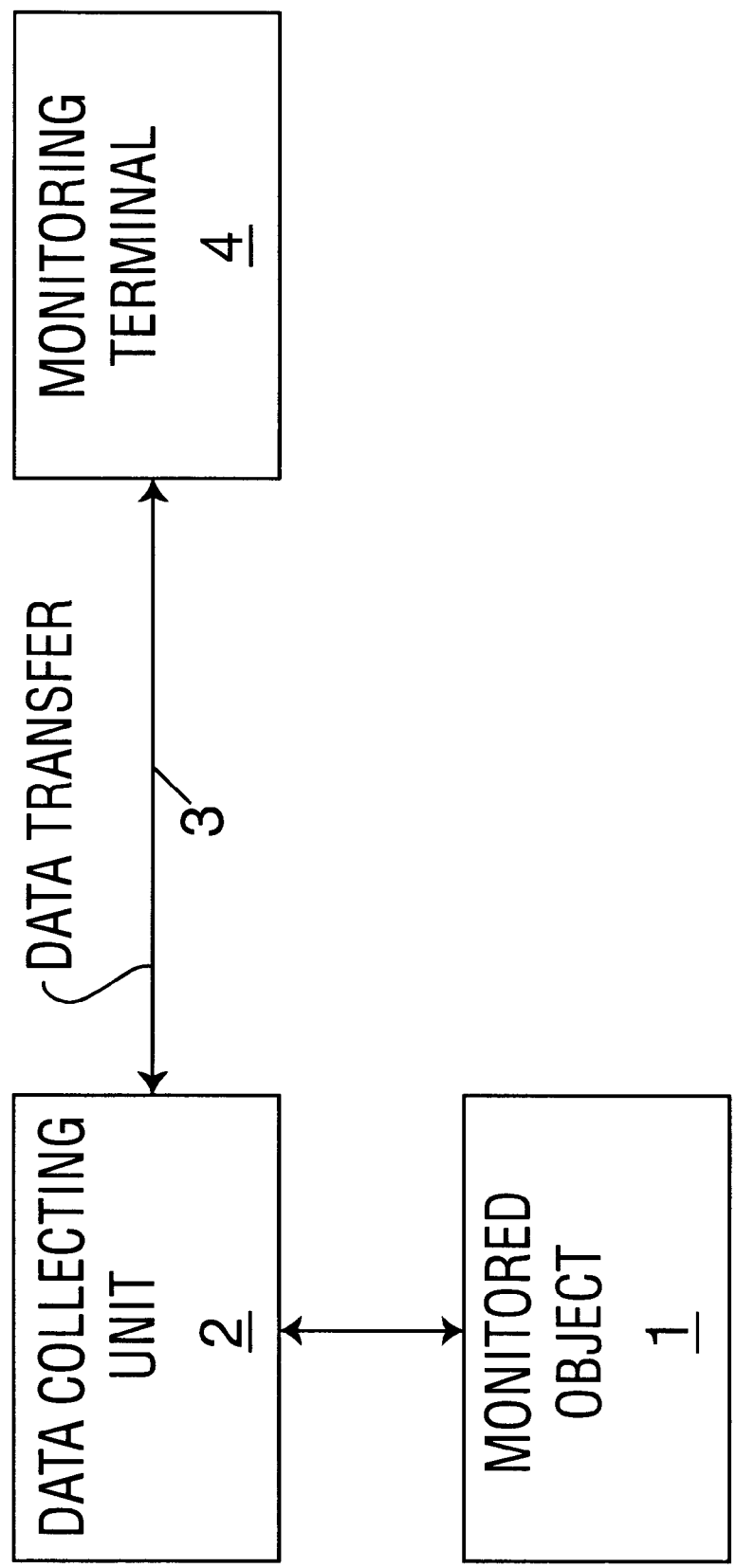
FIG. 3 is a schematic circuit block diagram of a programmed process, according to the present invention.

The invention shall be further described in the following by way of a preferred embodiment illustrated as a schematic circuit and described by way of a programmed process.

DESCRIPTION OF THE PREFERRED EMBODIMENTS

The schematic circuit includes a monitored 1 which in the present case can be a drive string and is connected with a data collecting unit 2. The data collecting unit 2 includes conventional sensors which are spatially arranged on the monitored object. Furthermore, the usual power supply and a conventional filter for the signal conditioning are provided for the sensors. In addition, each of the signal series generated by the sensors is associated with an analog-to-digital converter as digitizing device for the data collecting unit 2. The digitized signals are stored in an associated memory which is a component of a conventional computer which at the same time functions as control device in which the significance analysis is also carried out. The data transfer 3 for the communication with a monitoring terminal 4 is realized across a further provided common interface in the data collecting unit 2.

The data transfer 3 is preferably carded out through an existing stationary telephone network or a wireless telephone network or a satellite telephone network or the Internet.

A common interface for the communication with the data collecting unit 2 is also provided in the monitoring terminal 4. The monitoring terminal 4 includes essentially the same components as a conventional PC workstation with monitor and computer in which the incoming signals are stared, and displayed on the monitor. It is thereby made possible that all messages can be illustrated for monitoring purposes and used for possible interventions.

For the description of an example of a program for a process for the automated diagnosis, it is a basic requirement to define the required-terms for the definite description of the connections. Let x be a physical variable detected on a monitored object (component of a drive string such as motor, transmission, etc.), for example, the vibration acceleration,
the vibration speed,
the relative or absolute vibration amplitude,
torque,
the angular speed or,
the envelope curve of one of these physical variables.

Then the amplitude spectrum of x is specified by a frequency channel $f_i$ and an amplitude channel x(i) with i=1,2, . . . , N or $$i = \frac{f_i}{f_1},$$

whereby $f_i$ represents the frequency associated with each individual value and $f_1$ the step width As diagnostic requirement for each diagnosed property are deposited in a matrix

| k | – | name of the diagnosed property |
| $\frac{f_{k,th}}{f_{nl}}$ | – | order, relative to a fast wave |
| $\Delta f_{ku\%}$ | – | lower tolerance limit in percent |
| $\Delta f_{ko\%}$ | – | upper tolerance limit in percent |
| $\Delta i_{kS}$ | – | significance interval in percent |
| $z_k$ | – | property specific constant (replaces the α-fractile of the significance theory) |
| alarm | – | determines how often the significance threshold can be exceeded prior to alarm activation. |

The error probability and the damage type related weighting are included in $Z_k$.

The properties k required for the diagnosis be specified by the theoretical kinetic frequency $f_{k,\,th}$ and the associated amplitude $x_{k,\,th}$.

Then, it is true for each property k:

On the basis of the theoretical kinetic relationships, the amplitude of the highest significance is used for the diagnosis of the property k. A lower tolerance limit $\Delta f_{ku\%}$ and an upper tolerance limit $\Delta f_{ko\%}$ are used therefor.

The highest significance $S_i = \max(S_i)$ for the property k is now formed in that i satisfies the condition $$\frac{f_{k,th}}{f_1}(1 - \Delta f_{ku\%}) \le i \le \frac{f_{k,th}}{f_1}(1 + \Delta f_{ko\%}).$$

For each Si is thereby:

$$S_i = \frac{x_i}{c_i} = \frac{x_i}{\partial_i z_k + \overline{x}_i} \text{ with}$$

$$\overline{x}_i = \frac{1}{2\Delta i_{kS}} \sum_{j=i-\frac{\Delta i_{kS}}{2}}^{i+\frac{\Delta i_{kS}}{2}} x_j \text{ and}$$

$$\delta_i = \sqrt{\frac{1}{2\Delta i_{kS}} \sum_{j=i-\frac{\Delta i_{kS}}{2}}^{i+\frac{\Delta i_{kS}}{2}} (x_j - \overline{x}_i)^2}$$

Therefore, $S_i$ gives the significance, which means the ratio of the amplitude $x_i$ to the variable significance threshold $c_i$.

The setup of a matrix is required for the practical processing: (here with the example of a pot milling transmission)

| Property k | Comment | Order $\frac{f_{k,th}}{f_{n1}}$ | $\Delta f_{ku\%}$ | $\Delta f_{krf\%}$ | $\Delta i_{ks}$ | $z_k$ | a-larm |
|---|---|---|---|---|---|---|---|
| n1 | Rotation Speed 1 | 1.0000 | 0.5 | 0.5 | 15 | 2.33 | 3 |
| n2 | Rotation Speed 2 | 0.1887 | 0.5 | 0.5 | 15 | 2.33 | 3 |
| n3 | Rotation Speed 3 | 0.0229 | 0.5 | 0.5 | 15 | 2.3 | 3 |
| nPlanet | Rotation Speed Planet Gear | 0.0531 | 0.5 | 0.5 | 15 | 2.33 | 3 |
| nUSonne | Rotation Speed Overroll Sun | 0.4974 | 0.5 | 0.5 | 15 | 2.33 | 3 |
| nUPlanet | Rotation Speed Overroll Planet Gear | 0.0531 | 0.5 | 0.5 | 15 | 2.33 | 3 |
| nUHohl | Rotation Speed Overroll Hollow Gear | 0.0686 | 0.5 | 0.5 | 15 | 2.33 | 3 |
| z1 | Tooth Mesh 1 | 10.0000 | 0.5 | 0.5 | 15 | 2.33 | 3 |
| z2 | Tooth Mesh 2 | 2.6529 | 0.5 | 0.5 | 15 | 2.33 | 3 |
| z1 − 2n1 | Lateral Band z1 − 2n1 | 8.0000 | 0.5 | 0.5 | 15 | 2.33 | 3 |
| z1 − n1 | Lateral Band z1 − n1 | 9.0000 | 0.5 | 0.5 | 15 | 2.33 | 3 |
| z1 + n1 | Lateral Band z1 + n1 | 11.0000 | 0.5 | 0.5 | 15 | 2.33 | 3 |
| z1 + 2n1 | Lateral Band z1 + 2n1 | 12.0000 | 0.5 | 0.5 | 15 | 2.33 | 3 |
| z1 − 2n2 | Lateral Band z1 − 2n2 | 9.6226 | 0.5 | 0.5 | 15 | 2.33 | 3 |
| z1 − n2 | Lateral Band z1 − n2 | 9.8113 | 0.5 | 0.5 | 15 | 2.33 | 3 |
| z1 + n2 | Lateral Band z1 + n2 | 10.1887 | 0.5 | 0.5 | 15 | 2.33 | 3 |
| z1 + 2n2 | Lateral Band z1 + 2n2 | 10.3774 | 0.5 | 0.5 | 15 | 2.33 | 3 |
| z2 − 2n2 | Lateral Band z2 − 2n2 | 2.2755 | 0.5 | 0.5 | 15 | 2.33 | 3 |
| z2 − n2 | Lateral Band z2 − n2 | 2.4642 | 0.5 | 0.5 | 15 | 2.33 | 3 |
| z2 + n2 | Lateral Band z2 + n2 | 2.8416 | 0.5 | 0.5 | 15 | 2.33 | 3 |
| z2 + 2n2 | Lateral Band z2 + 2n2 | 3.0303 | 0.5 | 0.5 | 15 | 2.33 | 3 |
| z2 − 2n3 | Lateral Band z2 − 2n3 | 2.6071 | 0.5 | 0.5 | 15 | 2.33 | 3 |
| z2 − n3 | Lateral Band z2 − n3 | 2.6300 | 0.5 | 0.5 | 15 | 2.33 | 3 |
| z2 + n3 | Lateral Band z2 + n3 | 2.6758 | 0.5 | 0.5 | 15 | 2.33 | 3 |
| z2 + 2n3 | Lateral Band z2 + 2n3 | 2.6987 | 0.5 | 0.5 | 15 | 2.33 | 3 |
| z2 − 2nUSonne | Lateral Band z2 − 2nUSonne | 1.6580 | 0.5 | 0.5 | 15 | 2.33 | 3 |
| z2 − nUSonne | Lateral Band z2 − nUSonne | 2.1555 | 0.5 | 0.5 | 15 | 2.33 | 3 |
| z2 + nUSonne | Lateral Band z2 + nUSonne | 3.1503 | 0.5 | 0.5 | 15 | 2.33 | 3 |

-continued

| Property k | Comment | Order $\frac{f_{k,th}}{f_{nl}}$ | Starting Values $\Delta f_{ku\%}$ | $\Delta f_{krf\%}$ | $\Delta i_{ks}$ | $z_k$ | a-larm |
|---|---|---|---|---|---|---|---|
| z2 + 2nUSonne | Lateral Band z2 + 2nUSonne | 3.6478 | 0.5 | 0.5 | 15 | 2.33 | 3 |
| z2 − 2nUPlanet | Lateral Band z2 − 2nUPlanet | 2.5468 | 0.5 | 0.5 | 15 | 2.33 | 3 |
| z2 − nUPlanet | Lateral Band z2 − nUPlanet | 2.5998 | 0.5 | 0.5 | 15 | 2.33 | 3 |
| z2 + nUPlanet | Lateral Band z2 + nUPlanet | 2.7060 | 0.5 | 0.5 | 15 | 2.33 | 3 |
| z2 + 2nUPlanet | Lateral Band z2 + 2nUPlanet | 2.7590 | 0.5 | 0.5 | 15 | 2.33 | 3 |
| z2 − 2nUHohl | Lateral Band z2 − 2nUHohl | 2.5157 | 0.5 | 0.5 | 15 | 2.33 | 3 |
| z2 − nUHohl | Lateral Band z2 − nUHohl | 2.3343 | 0.5 | 0.5 | 15 | 2.33 | 3 |
| z2 + nUHohl | Lateral Band z2 + nUHohl | 2.7215 | 0.5 | 0.5 | 15 | 2.33 | 3 |
| z2 + 2nUHohl | Lateral Band z2 + 2nUHohl | 2.7901 | 0.5 | 0.5 | 15 | 2.33 | 3 |
| SKF 332347, K | Cage Rotation Frequency | 0.4240 | 2.0 | 0.5 | 15 | 2.33 | 3 |
| SKF 332347, WA | Roller Body Spin Frequency | 2.9510 | 2.0 | 0.5 | 15 | 2.33 | 3 |
| SKF 332347, W | Roller Body Overroll Frequency | 5.9020 | 2.0 | 0.5 | 15 | 2.33 | 3 |
| SKF 332347, A | Outer Ring Overroll Frequency | 9.3300 | 2.0 | 0.5 | 15 | 2.33 | 3 |
| SKF 332347, I | Inner Ring Overroll Frequency | 12.6700 | 2.0 | 0.5 | 15 | 2 .33 | 3 |
| SKF 22344, K | Cage Rotation Frequency | 0.4190 | 2.0 | 0.5 | 15 | 2.33 | 3 |
| SKF 22344, WA | Roller Body Spin Frequency | 2.9590 | 2.0 | 0.5 | 15 | 2.33 | 3 |
| SKF 22344, W | Roller Body Overroll Frequency | 5.9180 | 2.0 | 0.5 | 15 | 2.33 | 3 |
| SKF 22344, A | Outer Ring Overroll Frequency | 7.1230 | 2.0 | 0.5 | 15 | 2.33 | 3 |
| SKF 22344, I | Inner Ring Overroll Frequency | 9.8700 | 2.0 | 0.5 | 15 | 2.33 | 3 |
| FAG 22344, K | Cage Rotation Frequency | 0.4110 | 2.0 | 0.5 | 15 | 2.33 | 3 |
| FAG 22344, WA | Roller Body Spin Frequency | 2.6430 | 2.0 | 0.5 | 15 | 2.33 | 3 |
| FAG 22344, W | Roller Body Overroll Frequency | 5.2860 | 2.0 | 0.5 | 15 | 2.33 | 3 |
| FAG 22344, A | Outer Ring Overroll Frequency | 6.1620 | 2.0 | 0.5 | 15 | 2.33 | 3 |
| FAG 22344, I | Inner Ring Overroll Frequency | 8.8380 | 2.0 | 0.5 | 15 | 2.33 | 3 |
| SKF 32056X, K | Cage Rotation Frequency | 0.0853 | 2.0 | 0.5 | 15 | 2.33 | 3 |
| SKF 32056X, WA | Roller Body Spin Frequency | 0.9330 | 2.0 | 0.5 | 15 | 2.33 | 3 |
| SKF 32056X, W | Roller Body Overroll Frequency | 1.8660 | 2.0 | 0.5 | 15 | 2.33 | 3 |
| SKF 32056X, A | Outer Ring Overroll Frequency | 2.6443 | 2.0 | 0.5 | 15 | 2.33 | 3 |
| SKF 32056X, I | Inner Ring Overroll Frequency | 3.2045 | 2.0 | 0.5 | 15 | 2.33 | 3 |
| SKF NU2244, K | Cage Rotation Frequency | 0.0830 | 2.0 | 0.5 | 15 | 2.33 | 3 |
| SKF NU2244, WA | Roller Body Spin Frequency | 0.7189 | 2.0 | 0.5 | 15 | 2.33 | 3 |
| SKF NU2244, W | Roller Body Overroll Frequency | 1.4378 | 2.0 | 0.5 | 15 | 2.33 | 3 |
| SKF NU2244, A | Outer Ring Overroll Frequency | 1.5604 | 2.0 | 0.5 | 15 | 2.33 | 3 |
| SKF NU2244, I | Inner Ring Overroll Frequency | 2.0245 | 2.0 | 0.5 | 15 | 2.33 | 3 |
| SKF 23248CC, K | Cage Rotation Frequency | 0.0228 | 2.0 | 0.5 | 15 | 2.33 | 3 |
| SKF 23248CC, WA | Roller Body Spin Frequency | 0.1802 | 2.0 | 0.5 | 15 | 2.33 | 3 |
| SKF 23248CC, W | Roller Body Overroll Frequency | 0.3604 | 2.0 | 0.5 | 15 | 2.33 | 3 |
| SKF 23248CC, A | Outer Ring Overroll Frequency | 0.4333 | 2.0 | 0.5 | 15 | 2.33 | 3 |
| SKF 23248CC, I | Inner Ring Overroll Frequency | 0.5749 | 2.0 | 0.5 | 15 | 2.33 | 3 |
| FAG 23248B, K | Cage Rotation Frequency | 0.0229 | 2.0 | 0.5 | 15 | 2.33 | 3 |
| FAG 23248B, WA | Roller Body Spin Frequency | 0.1824 | 2.0 | 0.5 | 15 | 2.33 | 3 |
| FAG 23248B, W | Roller Body Overroll Frequency | 0.3648 | 2.0 | 0.5 | 15 | 2.33 | 3 |
| FAG 23248B, A | Outer Ring Overroll Frequency | 0.4571 | 2.0 | 0.5 | 15 | 2.33 | 3 |
| FAG 23248B, I | Inner Ring Overroll Frequency | 0.6040 | 2.0 | 0.5 | 15 | 2.33 | 3 |
| SKF NU10/560, K | Cage Rotation Frequency | 0.0103 | 2.0 | 0.5 | 15 | 2.33 | 3 |
| SKF NU10/560, WA | Roller Body Spin Frequency | 0.1221 | 2.0 | 0.5 | 15 | 2.33 | 3 |
| SKF NU10/560, W | Roller Body Overroll Frequency | 0.2442 | 2.0 | 0.5 | 15 | 2.33 | 3 |
| SKF NU10/560, A | Outer Ring Overroll Frequency | 0.2905 | 2.0 | 0.5 | 15 | 2.33 | 3 |
| SKF NU10/560, I | Inner Ring Overroll Frequency | 0.3499 | 2.0 | 0.5 | 15 | 2.33 | 3 |

The schematic program sequence is shown in principle in the following:

Start

1. Loop: For all $x$

2. Loop: For all $k$ $$S_k = 0$$

3. Loop: For all $i$, as long as $\frac{f_{k,th}}{f_1}(1 - \Delta f_{ku\%}) \leq i \leq \frac{f_{k,th}}{f_1}(1 + \Delta f_{ko\%})$ is satisfied.

$$\bar{x}_i = \frac{1}{2i\Delta f_{kS}} \sum_{j=i\left(1-\frac{\Delta f_{kS}}{2}\right)}^{i\left(1+\frac{\Delta f_{kS}}{2}\right)} x_j$$

-continued $$\delta_i = \sqrt{\frac{1}{2i\Delta f_{kS}} \sum_{j=i\left(1-\frac{\Delta f_{kS}}{2}\right)}^{i\left(1+\frac{\Delta f_{kS}}{2}\right)} (x_j - \bar{x}_i)^2}$$

$$S_i = \frac{x_i}{c_i} = \frac{x_i}{\delta_i z_k + \bar{x}_i}$$

if $S_k < S_i$, then $S_k = S_i$

End 3. Loop

If $S_k > 1$, then the vibration spectrum and all relevant data are stored and the variable *alarm* is decreased.

if *alarm* = 0, then the data transfer to the monitoring terminal is carried out, for example, per Modem, a message to the monitoring terminal is carried out, for example, per Fax, $z_k := 1, 1 - z_k$ set.

End 2. Loop

End 1. Loop back to Start

Example by way of a Turbo-Pascal program:

A Turbo-Pascal program has been used for simulation and verification which however only illustrates the function for only one x and one k. Within the framework of the remote diagnosis, the input variables $$\frac{f_{k,th}}{f_{nl}},$$

$\Delta f_{ku\%}$, $\Delta f_{ko\%}$, $\Delta ikS$, $Z_k$ and alarm are taken from a freely configurable matrix and $f_1$ is measured.

```
program significance;
uses crt;
const
novalue = 9.9e + 34;
var
o__th,f1,df__u,df__o,z,xq,d,si,s   : real;
i,j,a,b,k,y,di__s,n,alarm           : integer;
dat,dat2                            : text;
datname,datname2                    : string[60];
f,x                                 : array [0 . . . 4097] of real;
procedure input;
begin
write('f__th/f1     : ');readln(o__th);
write('f1           : ');readln(f1);
write('df__u        : ');readln(df__u);
write('df__o        : ');readln(df__o);
write('di__s        : ');readln(di__s);
write('z            : ');readln(z);
write('datname      : ');readln(datname);
write('datname2:    : ');readln(datname2);
write('N            : ');readln(n);
write('Alarm        : ');readln(alarm)
end;
procedure file;
begin
assign(dat,datname);
```

```
reset(dat);
i:=0;
    repeat
        readln(dat,f[i],x[i]);
        i:=i+1
    until i=n;
close(dat);
end;
procedure sig;
function sum1(anf,en:integer):real;
var sum:real;
begin
    j:=anf;sum:=0;
    while j<=en do
    begin
        sum:=sum+x[j];
        j:=j+1;
    end;
    sum1:=sum;
end;
function sum2(anf,en:integer):real;
var sum:real;
begin
    j:=anf;sum:=0;
    while j<=en do
    begin
        sum:=sum+sqr(x[j]-xq);
        j:=j+1;
    end;
    sum2:=sum;
end;
begin
a:=i-round((di__s-1)/2);
b:=i+round((di__s-1)/2);
xq:=1/(di-s)*sum1(a,b);
d:=sqrt(1/(di__s)*sum2(a,b));
si:=x[i]/(d*z+xq);
end;
procedure smax;
begin
s:=0;
```

```
-continued i:=0;
repeat
  if (round(o_th*fl*(1-df_u)/f[1])<=i) and
  (i<=round(o_th*f1*(1+df_o)/f[1]))
  then
    begin
      sig;
      begin
        writeln(dat2,f[i],' ',x[i],' ',si);
      end;
      if si > s then begin s:=si;k:=i end;
      i:=i+1;
    end
  else begin
    writeln(dat2,f[ ],' ',x[i],' ',novalue);
    i:=i+1;
  end;
until i=(n-1);
end;
procedure data into ring memory;
begin
{saves the spectrum, k, s and possibly reference data in the ring memory}
end;
procedure store alarm_in_matrix_;
begin
{for the remote diagnosis f_th_/fl, df_u, df_o, di_s, z and alarm
are taken from a freely configurable matrix, f1 is measured.
This procedure enables writing of alarm back into the matrix}
end;
procedure store z_in_matrix;
begin
{for the remote diagnosis f_th/f1, df_u, df_o, di_s, z and alarm
are taken from a freely configurable matrix, f1 is measured.
This procedure enables writing of z back into the matrix}
end:
procedure transmit date to monitoring terminal:
begin
{allows automatic data transfer into the SQL databank at the location of
the monitoring terminal}
end;
procedure alarm experts;
begin
{allows the automatic alarming of personnel at the location of the
monitoring terminal per Fax, E-Mail, etc.}
end:
begin
input;
assign(dat2,datname2);
rewrite(dat2);
  file;
  smax;
close(dat2);readln;
if s > 1 then
  begin
    data in ring memory;
    alarm:=alarm-1;
    store alarm in matrix
    if alarm=0 then
```

```
begin
  transfer date to the location of the monitoring terminal;
  alarm experts;
  z:=z*1.1;
  store_z_in_matrix;
  end
end
end.
```

What is claimed is:

1. A process for automated diagnosis of monitored objects, especially of drive strings, with a stationary, automatically operating data collecting unit positioned on the monitored object and a monitoring terminal spatially separated therefrom, said process comprising the steps of:

describing quantitatively a damage condition; activating data transfer reporting subsequently of diagnosis statements at the monitoring terminal being triggered by a significance of damaged property correspondingly weighted by damage type, or a combination of different damage properties;

specifying damage properties by an amplitude of physical variables associated with kinetic occurrences;

forming physical variables for harmonic excitation within a spectrum of a wide band signal detected by way of sensors on a machine surface, or for impact impulse type excitations from a high pass filtered envelope curve spectrum of the same signal or for discontinuously appearing determined impulse excitations from a maximum value envelope curve spectrum of the same signal; and describing a ratio of the amplitude of the damage property to a significance threshold of the damage properties by a significance. Whereby a variable significance threshold is used as a base so that on the basis of amplitudes of spectral lines surrounding the damage property, an error probability of the damage property is indicated.

2. A process according to claim 1, wherein the physical variable used is the vibration acceleration, the vibration speed, the relative or absolute vibration amplitude or the torque.

3. A process according to claim 1, wherein acceleration sensors, inductive or eddy current sensors or stretch sensitive bands are used as sensors depending on the physical variable to be detected.

* * * * *